US010137932B2

(12) United States Patent
Oguro

(10) Patent No.: US 10,137,932 B2
(45) Date of Patent: Nov. 27, 2018

(54) VEHICLE CONTROL DEVICE

(71) Applicant: HONDA MOTOR CO., LTD, Minato-ku, Tokyo (JP)

(72) Inventor: Hiroshi Oguro, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 0 days.

(21) Appl. No.: 15/718,190

(22) Filed: Sep. 28, 2017

(65) Prior Publication Data

US 2018/0093709 A1 Apr. 5, 2018

(30) Foreign Application Priority Data

Oct. 5, 2016 (JP) .................................. 2016-197099

(51) Int. Cl.
*B62D 15/02* (2006.01)
*B60W 30/12* (2006.01)
*G05D 1/02* (2006.01)
*B62D 6/00* (2006.01)

(52) U.S. Cl.
CPC ........... *B62D 15/025* (2013.01); *B60W 30/12* (2013.01); *B62D 6/002* (2013.01); *G05D 1/0212* (2013.01); *B60W 2520/10* (2013.01); *B60W 2550/146* (2013.01); *B60W 2710/207* (2013.01)

(58) Field of Classification Search
CPC ..... B62D 15/025; B62D 6/002; B60W 30/12; B60W 2550/10; G05D 1/0212
USPC ...................................................... 701/23, 41
See application file for complete search history.

(56) References Cited

U.S. PATENT DOCUMENTS 6,526,352 B1 * 2/2003 Breed ................ G01C 21/3697
342/357.31
2008/0046150 A1 * 2/2008 Breed ................. B60R 21/0134
701/45

FOREIGN PATENT DOCUMENTS

JP 2014-121984 7/2014

* cited by examiner

*Primary Examiner* — Tan Q Nguyen
(74) *Attorney, Agent, or Firm* — Amin, Turocy & Watson LLP

(57) ABSTRACT

A vehicle control device is equipped with a target steering angle generating unit adapted to generate a target steering angle for a vehicle from a relationship between acquired lane information and an attitude of the vehicle, during a period in which a low speed traveling state is being detected, or during a period until a predetermined condition from a mode transition time point is satisfied, and a steering angle control unit adapted to control the steering angle of the vehicle so as to agree with the generated target steering angle.

7 Claims, 16 Drawing Sheets

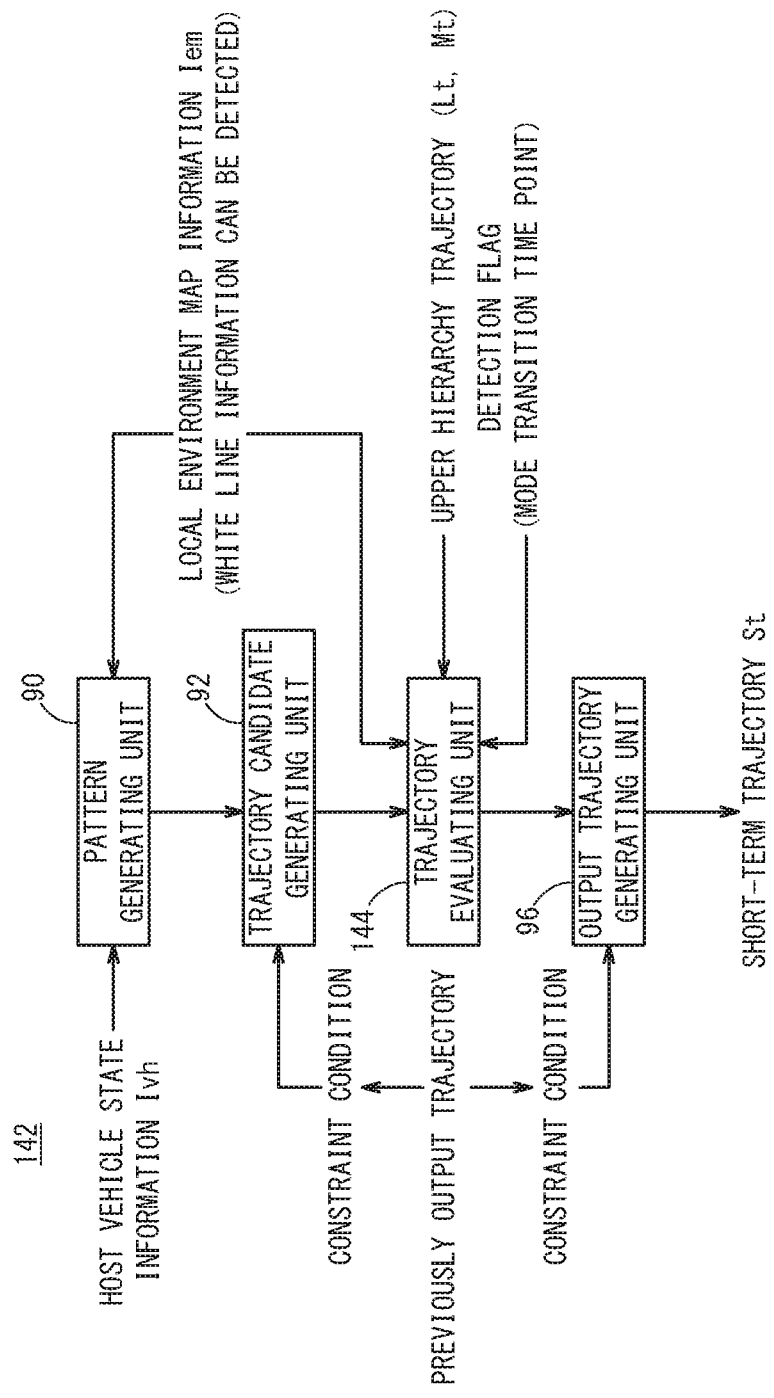

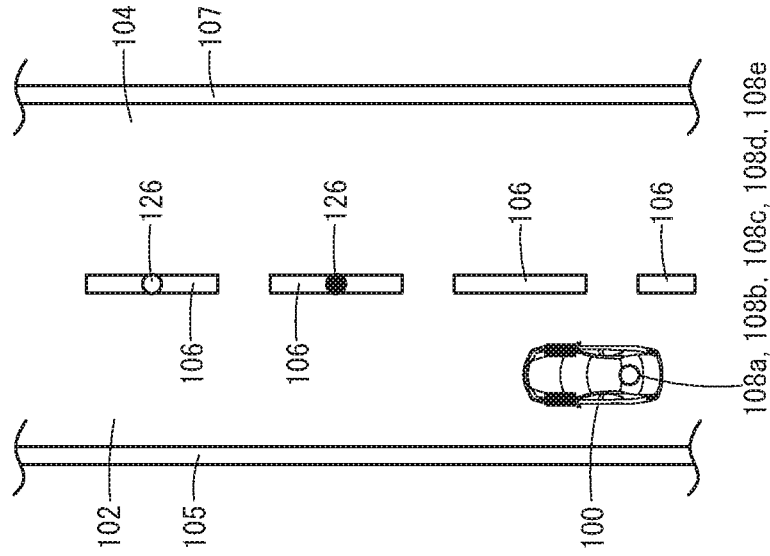
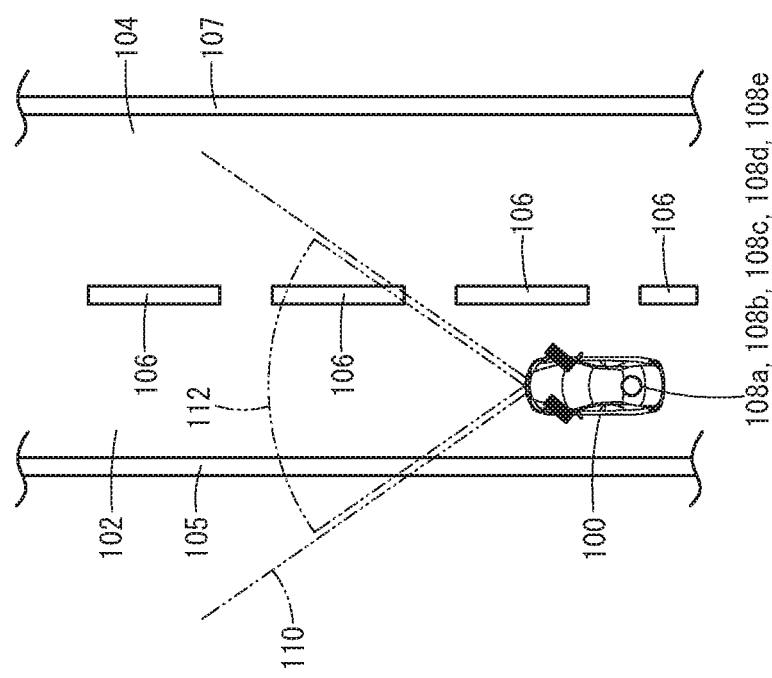

VEHICLE CONTROL DEVICE

CROSS-REFERENCE TO RELATED APPLICATION

This application is based upon and claims the benefit of priority from Japanese Patent Application No. 2016-197099 filed on Oct. 5, 2016, the contents of which are incorporated herein by reference.

BACKGROUND OF THE INVENTION

Field of the Invention

The present invention relates to a vehicle control device which is configured to be capable of implementing automatic driving or providing an automatic driving assist.

Description of the Related Art

In recent years, vehicle control devices, which are configured to be capable of implementing automatic driving or providing an automatic driving assist, have been developed. For example, a driving assist device is known, in which in an automatic driving mode, it is determined to perform automatic driving or automatic stopping of a vehicle that is traveling along a current travel path, in the case that a destination point for such automatic driving has not been set (see Japanese Laid-Open Patent Publication No. 2014-121984).

SUMMARY OF THE INVENTION

However, in accordance with such a conventional technology, cases may occur in which the vehicle cannot be made to advance or proceed smoothly in a desired direction.

The present invention has been devised in order to solve the aforementioned problem, and has the object of providing a vehicle control device, which is capable of causing a vehicle to proceed smoothly in a desired direction in a particular type of setting.

A vehicle control device according to a first aspect of the present invention is a device which is configured to be capable of implementing automatic driving or providing an automatic driving assist, comprising an external environment state detecting unit adapted to detect a state of the external environment of a vehicle, a lane information acquisition unit adapted to acquire lane information that is capable of specifying the shape of a lane in which the vehicle intends to travel, on the basis of a detection result by the external environment state detecting unit, a state detecting unit adapted to detect a low speed traveling state in which the speed of the vehicle is less than or equal to a predetermined value, a target steering angle generating unit adapted to generate a target steering angle for the vehicle from a relationship between lane information acquired from the lane information acquisition unit and an attitude of the vehicle, during a period in which the low speed traveling state is being detected, and a steering angle control unit adapted to control the steering angle of the vehicle so as to agree with the target steering angle generated by the target steering angle generating unit.

In a low speed traveling state in which the speed of the vehicle is less than or equal to a predetermined value, cases may occur in which the reliability of the detection result of the state of the host vehicle (user's own vehicle) or the state of the external environment decreases. Thus, during a period in which the low speed traveling state is being detected, lane information and attitude information of the vehicle having a relatively high reliability of detection accuracy are used, and therefore, the target steering angle for steering the vehicle in a direction along the shape of the lane can be generated with high accuracy. Consequently, even if the speed of the vehicle is less than or equal to the predetermined value, the vehicle can be made to proceed smoothly in a desired direction.

Further, in relation to the vehicle control device according to the first aspect of the present invention, the target steering angle generating unit may generate the target steering angle from a relationship between an orientation of the vehicle and an orientation of the lane as indicated by the lane information, and/or from a relationship between a curvature corresponding to the attitude of the vehicle and a curvature of the lane as indicated by the lane information.

Further, in relation to the vehicle control device according to the first aspect of the present invention, the lane information acquisition unit may acquire the lane information which is actually detected by the external environment state detecting unit under the low speed traveling state.

Further, in relation to the vehicle control device according to the first aspect of the present invention, there may further be provided a trajectory generating unit adapted to generate a travel trajectory for the vehicle based on a detection result by the external environment state detecting unit, and the lane information acquisition unit may acquire as the lane information the travel trajectory generated by the trajectory generating unit.

A vehicle control device according to a second aspect of the present invention is a device which is configured to be capable of implementing automatic driving or providing an automatic driving assist, comprising an external environment state detecting unit adapted to detect a state of the external environment of a vehicle, a lane information acquisition unit adapted to acquire lane information that is capable of specifying the shape of a lane in which the vehicle intends to travel, on the basis of a detection result by the external environment state detecting unit, a transition detecting unit adapted to detect a mode transition time point at which an automatic driving mode transitions from an OFF state to an ON state while the vehicle is stopped, a target steering angle generating unit adapted to generate a target steering angle for the vehicle from a relationship between lane information acquired from the lane information acquisition unit and an attitude of the vehicle, during a period from the mode transition time point detected by the transition detecting unit until a predetermined condition is satisfied, and a steering angle control unit adapted to control the steering angle of the vehicle so as to agree with the target steering angle generated by the target steering angle generating unit.

Because the amount of information relating to the vehicle state or the external environment state is insufficient for a certain period from the point in time at which a mode transition is made to transition the automatic driving mode from the OFF state to the ON state while the vehicle is stopped, cases may occur in which automatic driving of the vehicle cannot be performed smoothly. Thus, during a period until the predetermined condition is satisfied, lane information and attitude information of the vehicle having a relatively high reliability of detection accuracy are used, and therefore, the target steering angle for steering the vehicle in a direction along the shape of the lane can be generated with high accuracy. Consequently, even immediately after transitioning into the automatic driving mode, the vehicle can be made to proceed smoothly in a desired direction.

Further, in relation to the vehicle control device according to the second aspect of the present invention, the target steering angle generating unit may generate the target steering angle from a relationship between an orientation of the vehicle and an orientation of the lane as indicated by the lane information, and/or from a relationship between a curvature corresponding to the attitude of the vehicle and a curvature of the lane as indicated by the lane information.

Further, in relation to the vehicle control device according to the second aspect of the present invention, the lane information acquisition unit may acquire, until the predetermined condition is satisfied, the lane information which is actually detected by the external environment state detecting unit.

In accordance with the vehicle control device according to the present invention, it is possible for the vehicle to proceed smoothly in a desired direction in a particular type of setting.

The above and other objects, features, and advantages of the present invention will become more apparent from the following description when taken in conjunction with the accompanying drawings, in which preferred embodiments of the present invention are shown by way of illustrative example.

BRIEF DESCRIPTION OF THE DRAWINGS

FIG. 15 is a detailed block diagram of a target steering angle generating unit shown in FIG. 14; and FIG. 16A and FIG. 16B are transition diagrams showing changes over time in the behavior of the vehicle.

DESCRIPTION OF THE PREFERRED EMBODIMENTS

Preferred embodiments of a vehicle control device according to the present invention will be presented and described in detail below with reference to the accompanying drawings.

[Configuration of Vehicle Control Device 10 Common to the Respective Embodiments]
<Overall Configuration>

Figure 1:
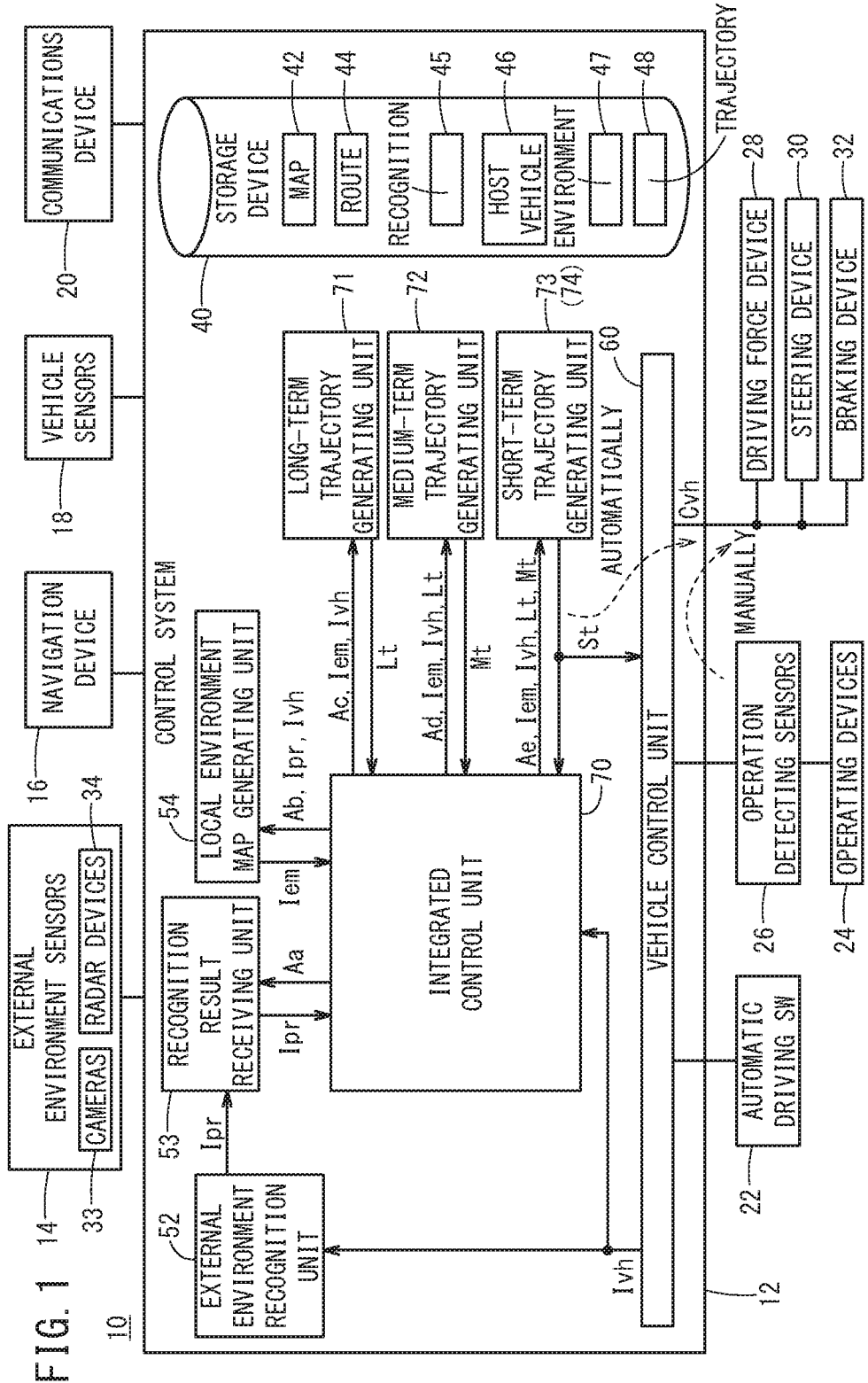
FIG. 1 is a block diagram showing the configuration of a vehicle control device which is common to the respective embodiments of the present invention.

FIG. 1 is a block diagram showing the configuration of a vehicle control device 10 which is common to each of the respective embodiments of the present invention. The vehicle control device 10 is incorporated in a vehicle 100 (see FIG. 7, etc.) and is configured to be capable of implementing automatic driving or providing an automatic driving assist for the vehicle 100. The vehicle control device 10 is equipped with a control system 12, input devices, and output devices. The input devices and the output devices are connected to the control system 12 via a communications line.

The input devices include external environment sensors 14, a navigation device 16, vehicle sensors 18, a communications device 20, an automatic driving switch 22, and operation detecting sensors 26 connected to operating devices 24.

The output devices include a driving force device 28 for driving the vehicle wheels (not shown), a steering device 30 for steering the vehicle wheels, and a braking device 32 for braking the vehicle wheels.
<Specific Configuration of Input Devices>

The external environment sensors 14 include a plurality of cameras 33 and a plurality of radar devices 34, which acquire information (hereinafter referred to as external environmental information) indicative of the state of the external environment around the vehicle 100, and transmit the acquired external environmental information to the control system 12. The external environment sensors 14 may further be equipped with a plurality of LIDAR (Light Detection and Ranging; Laser Imaging Detection and Ranging) devices.

The navigation device 16 is constituted to include a satellite positioning device, which is capable of detecting a current position of the vehicle 100, and a user interface (for example, a touch-panel display, a speaker, and a microphone). Based on the current position of the vehicle 100 or a position designated by the user, the navigation device 16 calculates a route to a designated destination point, and outputs the route to the control system 12. The route calculated by the navigation device 16 is stored as route information in a route information storage unit 44 of a storage device 40.

The vehicle sensors 18 output to the control system 12 detection signals from respective sensors, including a speed sensor for detecting the speed (vehicle velocity), an acceleration sensor for detecting an acceleration, a lateral G sensor for detecting a lateral G force, a yaw rate sensor for detecting an angular velocity about a vertical axis, an orientation sensor for detecting an orientation, and a gradient sensor for detecting a gradient of the vehicle 100. The detection signals are stored, as vehicle state information Ivh of the host vehicle, in a host vehicle state information storage unit 46 of the storage device 40.

The communications device 20 is configured to be capable of communicating with external devices including roadside devices, other vehicles, and a server, and transmits and receives, for example, information related to transportation facilities, information related to other vehicles, probe information, or latest map information. The map information is stored in the navigation device 16, and also is stored as map information in a map information storage unit 42 of the storage device 40.

The operating devices 24 include an accelerator pedal, a steering wheel (handle), a brake pedal, a shift lever, and a direction indication (turn signal) lever. The operation detecting sensors 26, which detect the presence or absence or the operated amounts of operations made by the driver, as well as operated positions, are attached to the operating devices 24.

The operation detecting sensors 26 output to the vehicle control unit 60 as detection results an amount by which the accelerator is depressed (degree of accelerator opening), an amount (steering amount) at which the steering wheel is operated, an amount by which the brake pedal is depressed, a shift position, and a right or left turn direction, etc.

The automatic driving switch 22, for example, is a push-button switch provided on the instrument panel, and is used by a user including a driver in order to switch by manual operation between a non-automatic driving mode (manual driving mode) and an automatic driving mode.

According to the present embodiment, the automatic driving mode and the non-automatic driving mode are switched each time the automatic driving switch 22 is pressed. Instead of this feature, in order to provide confirmation of a driver's intention to switch to automatic driving, it is possible to provide settings in which, for example, switching from the non-automatic driving mode to the automatic driving mode is effected by pressing twice, and switching from the automatic driving mode to the non-automatic driving mode is effected by pressing once.

The automatic driving mode is a driving mode in which the vehicle 100 travels under the control of the control system 12 while the driver does not operate the operating devices 24 (specifically, the accelerator pedal, the steering wheel, and the brake pedal). Stated otherwise, in the automatic driving mode, the control system 12 controls a portion or all of the driving force device 28, the steering device 30, and the braking device 32, on the basis of sequentially determined action plans (on a short-term basis, equivalent to a short-term trajectory St which will be described later).

Moreover, during the automatic driving mode, in the case that the driver starts to operate any of the operating devices 24, the automatic driving mode is canceled automatically, and the system switches over to the non-automatic driving mode (manual driving mode).

<Specific Configuration of Output Devices>

The driving force device 28 is constituted from a driving force ECU (Electronic Control Unit), and a drive source including an engine and/or a driving motor. The driving force device 28 generates a travel driving force (torque) in order for the vehicle 100 to travel in accordance with vehicle control values Cvh input thereto from the vehicle control unit 60, and transmits the travel driving force to the vehicle wheels directly or through a transmission.

The steering device 30 is constituted from an EPS (electric power steering system) ECU, and an EPS device. The steering device 30 changes the orientation of the wheels (steered wheels) in accordance with vehicle control values Cvh input thereto from the vehicle control unit 60.

The braking device 32, for example, is an electric servo brake used in combination with a hydraulic brake, and is made up from a brake ECU and a brake actuator. The braking device 32 brakes the vehicle wheels in accordance with vehicle control values Cvh input thereto from the vehicle control unit 60.

<Configuration of Control System 12>

The control system 12 is constituted by one or a plurality of ECUs, and is equipped with the storage device 40, etc., in addition to various function realizing units. According to the present embodiment, the function realizing units are software-based functional units, in which the functions thereof are realized by a CPU (central processing unit) executing programs stored in the storage device 40. However, the functions thereof can also be realized by hardware-based functional units made up from integrated circuits or the like.

In addition to the storage device 40 and the vehicle control unit 60, the control system 12 is configured to include an external environment recognition unit 52, a recognition result receiving unit 53, a local environment map generating unit 54, an integrated control unit 70, a long-term trajectory generating unit 71, a medium-term trajectory generating unit 72, and a short-term trajectory generating unit 73. In this instance, the integrated control unit 70 carries out a comprehensive control of the respective units by controlling task synchronization of the tasks of the recognition result receiving unit 53, the local environment map generating unit 54, the long-term trajectory generating unit 71, the medium-term trajectory generating unit 72, and the short-term trajectory generating unit 73 (74).

On the basis of the external environmental information (including image information) from the external environment sensors 14, the external environment recognition unit 52 refers to the host vehicle state information Ivh from the vehicle control unit 60, and recognizes lane markings (white lines) on both sides of the vehicle 100, together with generating "static" external environment recognition information including the distance to stop lines, and travel capable areas. Along therewith, on the basis of the external environmental information from the external environment sensors 14, the external environment recognition unit 52 generates "dynamic" external environment recognition information, such as obstacles (including parked or stopped vehicles), traffic participants (people, other vehicles), and the colors of traffic signals (blue (green), yellow (orange), red), and the like.

The static and dynamic external environment recognition information are stored respectively, as external environment recognition information Ipr, in an external environment recognition information storage unit 45 of the storage device 40.

In response to an operation command Aa, the recognition result receiving unit 53 outputs to the integrated control unit 70 the external environment recognition information Ipr, which was received within a predetermined calculation cycle Toc (standard cycle or standard calculation cycle), together with a count value of an update counter. In this instance, the calculation cycle Toc is a standard calculation cycle within the control system 12, and is set to a value on the order of several tens of ms, for example.

In response to an operation command Ab from the integrated control unit 70, the local environment map generating unit 54 refers to the host vehicle state information Ivh as well as the external environment recognition information Ipr, and inside of the calculation cycle Toc, generates local environment map information Iem, and outputs the information to the integrated control unit 70 together with the count value of the update counter. More specifically, at the start of the control, an operation cycle 2×Toc is required until the local environment map information Iem is generated.

The local environment map information Iem is information obtained by mapping the travel environment of the vehicle 100, and roughly is composed of a synthesis of the vehicle state information Ivh and an ideal travel route 128 (to be described later in FIG. 11) with respect to the external environment recognition information Ipr. The local environment map information Iem is stored in a local environment map information storage unit 47 of the storage device 40.

In response to an operation command Ac from the integrated control unit 70, the long-term trajectory generating unit 71 generates a long-term trajectory Lt at the relatively longest calculation cycle (e.g., 9×Toc), by referring to the local environment map information Iem (using only static components from among the external environment recognition information Ipr), the host vehicle state information Ivh, and a road map (curvatures of curving road and the like) which is stored in the map information storage unit 42. In addition, the long-term trajectory generating unit 71 outputs the generated long-term trajectory Lt to the integrated control unit 70 together with the count value of the update counter. Moreover, the long-term trajectory Lt is stored as trajectory information in a trajectory information storage unit 48 of the storage device 40.

In response to an operation command Ad from the integrated control unit 70, the medium-term trajectory generating unit 72 generates a medium-term trajectory Mt at a relatively medium length calculation cycle (e.g., 3×Toc), by referring to the local environment map information Iem (using both dynamic components and static components from among the external environment recognition information Ipr), the host vehicle state information Ivh, and the long-term trajectory Lt. In addition, the medium-term trajectory generating unit 72 outputs the generated medium-term trajectory Mt to the integrated control unit 70 together with the count value of the update counter. Moreover, in the same manner as the long-term trajectory Lt, the medium-term trajectory Mt is stored as trajectory information in the trajectory information storage unit 48 of the storage device 40.

In response to an operation command Ae from the integrated control unit 70, the short-term trajectory generating unit 73 generates a short-term trajectory St at the relatively shortest calculation cycle (e.g., Toc), by referring to the local environment map information Iem (using both dynamic components and static components from among the external environment recognition information Ipr), the host vehicle state information Ivh, the long-term trajectory Lt, and the medium-term trajectory Mt. In addition, the short-term trajectory generating unit 73 outputs the generated short-term trajectory St simultaneously to the integrated control unit 70 and the vehicle control unit 60, together with the count value of the update counter. Moreover, in the same manner as the long-term trajectory Lt and the medium-term trajectory Mt, the short-term trajectory St is stored as trajectory information Ir in the trajectory information storage unit 48. A short-term trajectory generating unit 74, to be described later, includes the same functions as the aforementioned functions.

The long-term trajectory Lt is indicative of a trajectory with a travel time on the order of, for example, ten seconds, and is a trajectory in which priority is placed on riding comfort and pleasure. Further, the short-term trajectory St is indicative of a trajectory with a travel time on the order of, for example, one second, and is a trajectory in which priority is placed on realizing vehicle dynamics and ensuring safety. The medium-term trajectory Mt is indicative of a trajectory with a travel time on the order of, for example, five seconds, and is an intermediate trajectory with respect to the long-term trajectory Lt and the short-term trajectory St.

The short-term trajectory St corresponds to a data set which indicates a target behavior of the vehicle 100 for each of respective short cycles Ts (=Toc). The short-term trajectory St, for example, is a trajectory plot (x, y, $\theta z$, Vs, Va, $\rho$, $\gamma$, $\delta st$) defined by data units of a position x in the longitudinal direction (X-axis), a position y in the lateral direction (Y-axis), a posture angle $\theta z$ (yaw angle), a speed Vs, an acceleration Va, a curvature $\rho$, a yaw rate $\gamma$, and a steering angle $\delta st$. Further, the long-term trajectory Lt or the medium-term trajectory Mt is made up of a data set defined in the same way as that of the short-term trajectory St, although having different cycles, respectively.

The vehicle control unit 60 determines the vehicle control values Cvh, which enable the vehicle 100 to travel in accordance with the behaviors specified by the short-term trajectory St, and outputs the obtained vehicle control values Cvh to the driving force device 28, the steering device 30, and the braking device 32.

First Embodiment

First, a description will be given with reference to FIGS. 2 to 11 concerning a vehicle control device 10A (in particular, the short-term trajectory generating unit 73) according to the first embodiment.

<Principal Characteristic Components>

Figure 2:
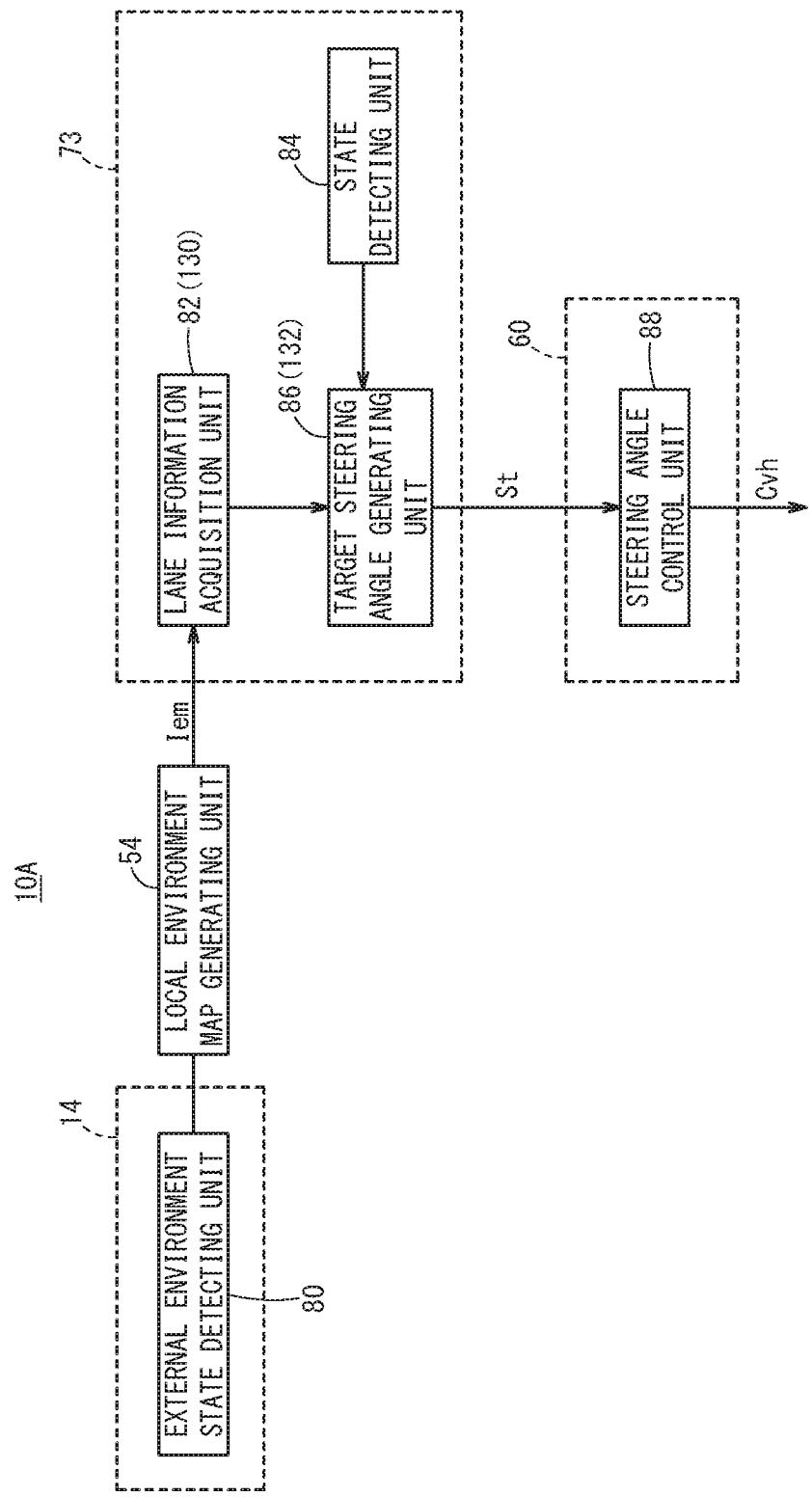
FIG. 2 is a functional block diagram showing principal characteristic components in a first embodiment.

FIG. 2 is a functional block diagram showing principal characteristic components in the first embodiment. In addition to the local environment map generating unit 54 (see FIG. 1), the vehicle control device 10A includes an external environment state detecting unit 80, a lane information acquisition unit 82, a state detecting unit 84, a target steering angle generating unit 86, and a steering angle control unit 88.

The external environment state detecting unit 80 corresponds to the external environment sensors 14 shown in FIG. 1. The lane information acquisition unit 82, the state detecting unit 84, and the target steering angle generating unit 86 correspond to the short-term trajectory generating unit 73 shown in FIG. 1. The steering angle control unit 88 corresponds to the vehicle control unit 60 shown in FIG. 1.

The external environment state detecting unit 80 (more specifically, the cameras 33 or the radar devices 34) detects the state of the external environment around the vehicle 100. For example, using the cameras 33, captured images are obtained including the travel lane 102 (see FIG. 7, etc.) in which the vehicle 100 intends to travel.

The lane information acquisition unit 82 acquires lane information, which is capable of specifying the shape of the travel lane 102, from the local environment map information Iem including the detection result from the external environment state detecting unit 80. For example, in the case that the lane marking is shaped in the form of a broken line, as a specific example of the lane information, the two-dimensional position (x, y) of a representative point of the line element, the posture angle $\theta z$, and a curvature $\rho$ are given.

The state detecting unit 84 detects a state (hereinafter referred to as a low speed traveling state) in which the speed Vs of the vehicle 100 is less than or equal to a predetermined value. Typically, the predetermined value is a slow speed (roughly 10 [km/s]) at which the vehicle 100 is capable of stopping immediately, although other values (more specifically, 5 [km/s] or 15 [km/s]) may be adopted for the predetermined value.

The target steering angle generating unit 86 generates a target steering angle (a time-series pattern for the steering angle $\delta st$) to be used for generating the short-term trajectory St using at least the lane information that is acquired by the lane information acquisition unit 82. The target steering angle generating unit 86 generates a target steering angle from the relationship between the acquired lane information and the attitude or posture of the vehicle 100, during a period in which the low speed traveling state is being detected by the state detecting unit 84. In this instance, a relationship is considered between the posture angle θz of the travel lane 102 or the lane markings 106 (see FIG. 7, etc.) and the posture angle θz of the vehicle 100. In conjunction therewith or separately therefrom, a relationship is considered between the curvature ρ of the travel lane 102 or the lane marking 106 and a curvature ρ corresponding to the attitude or posture of the vehicle 100.

The steering angle control unit 88 carries out a steering angle control with respect to the vehicle 100, in accordance with the target steering angle that was generated by the target steering angle generating unit 86. More specifically, the steering angle control unit 88 outputs a steering angle pattern (vehicle control values Cvh) indicated by the short-term trajectory St to the steering device 30.

<Detailed Block Diagram of Target Steering Angle Generating Unit 86>

Figure 3:
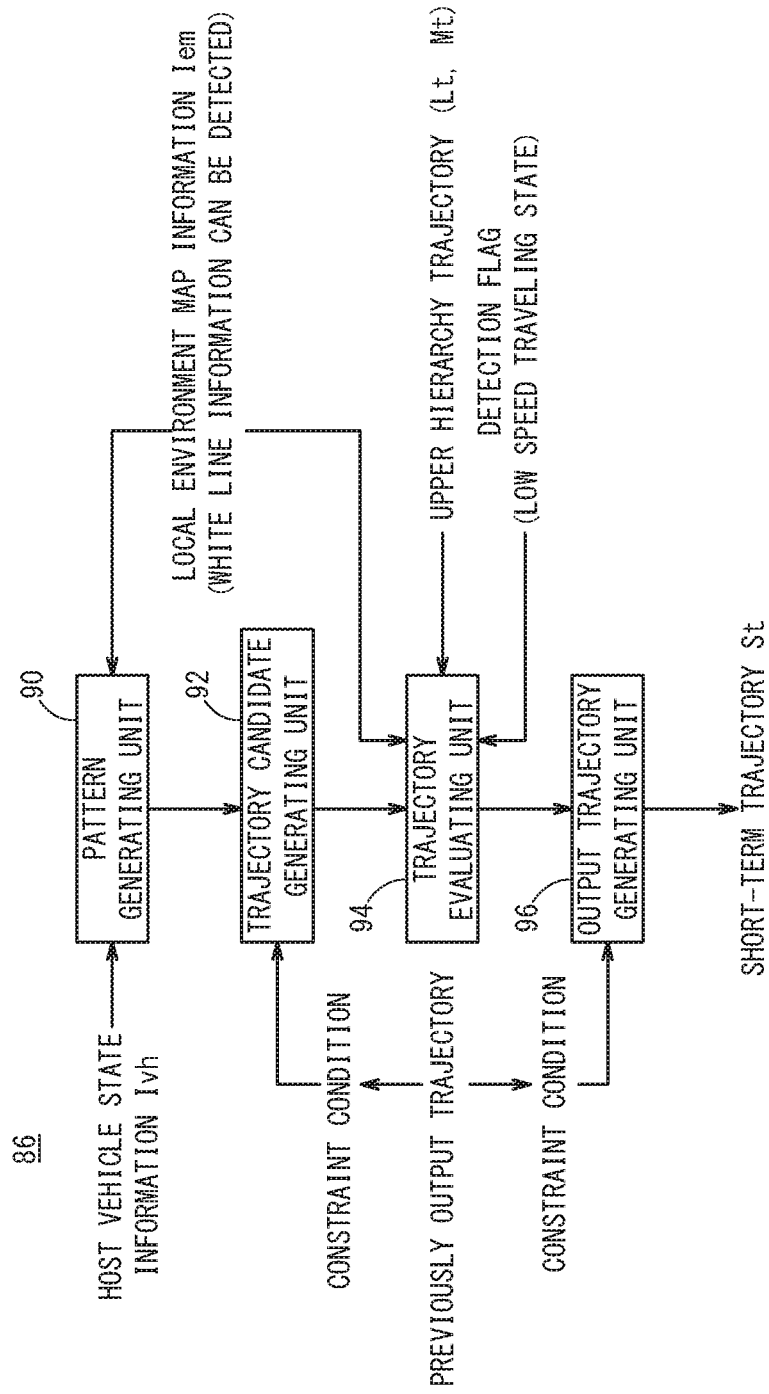
FIG. 3 is a detailed block diagram of a target steering angle generating unit in the first embodiment.

FIG. 3 is a detailed block diagram of the target steering angle generating unit 86 in the first embodiment. The target steering angle generating unit 86 comprises a pattern generating unit 90, a trajectory candidate generating unit 92, a trajectory evaluating unit 94, and an output trajectory generating unit 96.

Using the host vehicle state information Ivh and the local environment map information Iem, the pattern generating unit 90 generates a variation group in relation to two types of patterns that are used for generating the short-term trajectory St. More specifically, the pattern generating unit 90 generates variation groups, respectively, in relation to [1] a speed pattern (vertical pattern), which indicates a time series of the vehicle speed Vs, and [2] a steering angle pattern (horizontal pattern), which indicates a time series of the steering angle δst.

Figure 4A:
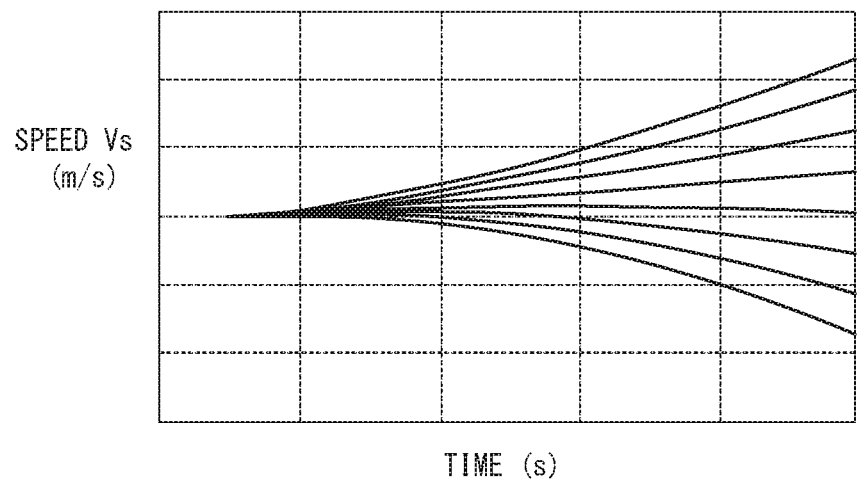
FIG. 4A is a diagram showing an example of a variation group in relation to a speed pattern.

FIG. 4A is a diagram showing an example of a variation group in relation to a speed pattern. Time [t] is shown on the horizontal axis of the graph, whereas the vehicle speed Vs [m/s] is shown on the vertical axis of the graph. At the earliest time, the speeds Vs are equal in all of the patterns. Such a value corresponds to a speed Vs (most recently measured value) included in the host vehicle state information Ivh.

As can be understood from the figure, in this variation group, there are included patterns in which the speed Vs increases, or patterns in which the speed Vs decreases along with the elapse of time, or alternatively, a pattern in which the speed Vs remains substantially constant regardless of the passage of time. In this instance, the amount of change in the vehicle speed Vs, the function shapes, and the number of variations are set arbitrarily according to various computational conditions.

Figure 4B:
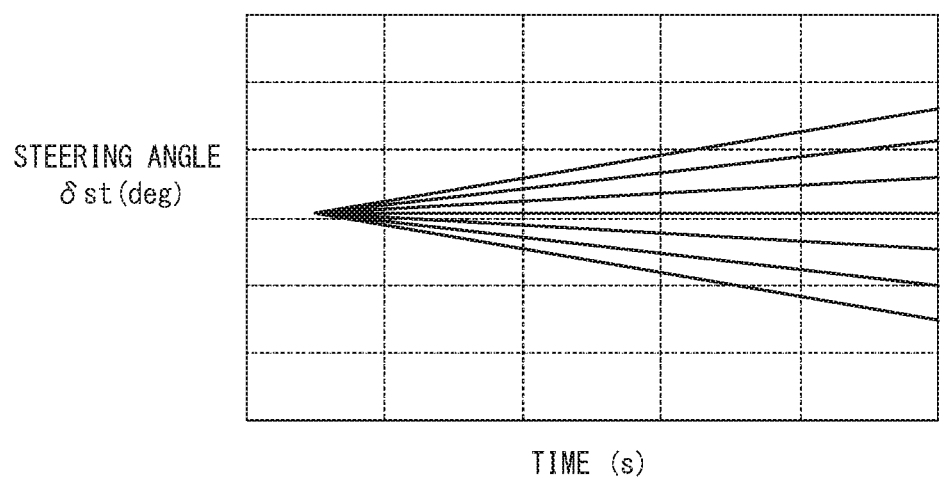
FIG. 4B is a diagram showing an example of a variation group in relation to a steering angle pattern.

FIG. 4B is a diagram showing an example of a variation group in relation to a steering angle pattern. Time [s] is shown on the horizontal axis of the graph, whereas the steering angle δst [deg] is shown on the vertical axis of the graph. At the earliest time, the steering angles δst are equal in all of the patterns. Such a value corresponds to a steering angle δst (most recently measured value) included in the host vehicle state information Ivh.

As can be understood from the figure, in this variation group, there are included patterns in which the steering angle δst increases, or patterns in which the steering angle δst decreases along with the elapse of time, or alternatively, a pattern in which the steering angle δst remains substantially constant regardless of the passage of time. In this instance, the amount of change in the steering angle δst, the function shapes, and the number of variations are set arbitrarily according to various computational conditions.

The trajectory candidate generating unit 92 generates candidates for the short-term trajectory St (hereinafter referred to simply as "trajectory candidates") using the variation group of the patterns generated by the pattern generating unit 90. More specifically, the trajectory candidate generating unit 92 combines the speed patterns and the steering angle patterns to thereby generate a large number of trajectory candidates, each of which includes time-series information of a two-dimensional position (x, y), respectively. Moreover, in the event there is a short-term trajectory St (hereinafter referred to as a previous output trajectory) that was generated most recently, a constraint condition may be provided for achieving consistency with the short-term trajectory St.

Figure 5:
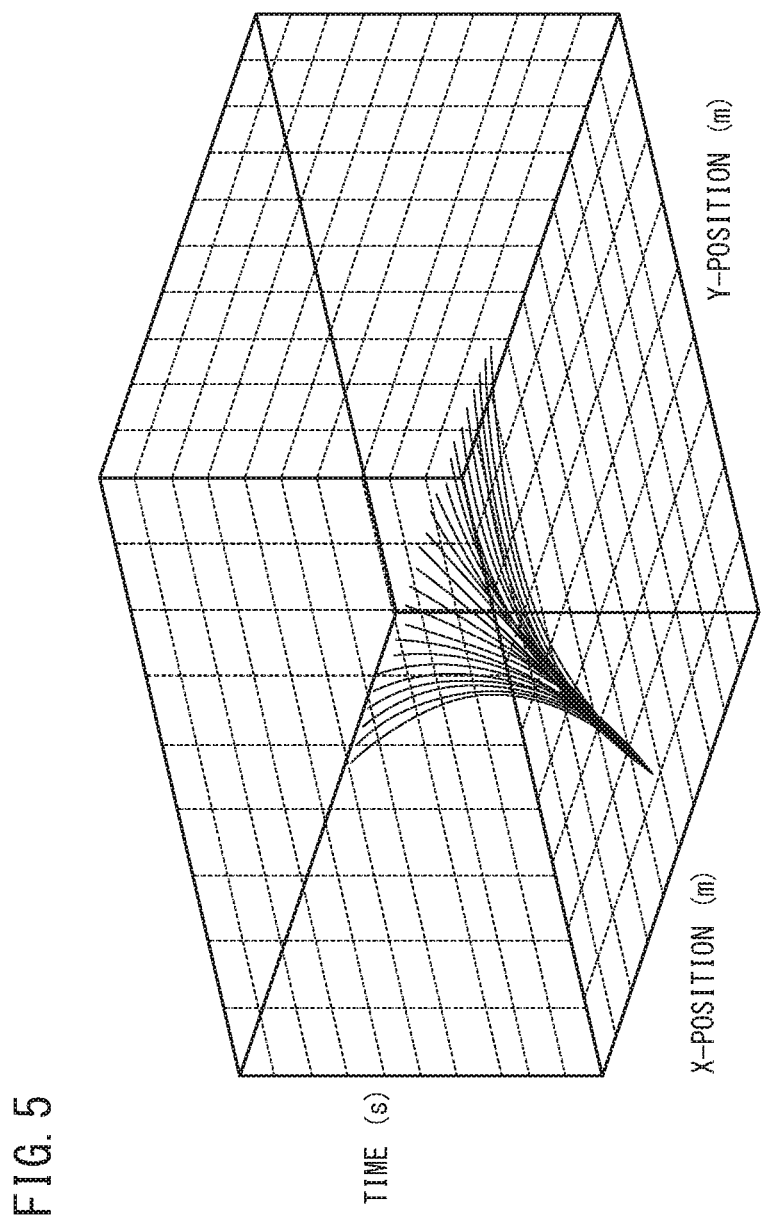
FIG. 5 is a diagram schematically showing results in which a large number of trajectory candidates are generated.

FIG. 5 is a diagram schematically showing results in which a large number of trajectory candidates are generated. A position x (X position; unit [m]) on an X-axis is shown on a first axis of the graph, a position y (Y position; unit [m]) on a Y-axis is shown on a second axis of the graph, and time (unit [s]) is shown on a third axis of the graph. As can be understood from the figure, as time elapses, variations in the positions (namely, the behavior of the vehicle 100) of the trajectory candidates themselves become large.

The trajectory evaluating unit 94 performs an evaluation process in accordance with a predetermined evaluation standard with respect to each of the large number of trajectory candidates that were generated by the trajectory candidate generating unit 92. As the evaluation standard, the local environment map information Iem (this is premised on it being "possible to detect the white line information Lw"), or an upper hierarchy trajectory (the long-term trajectory Lt or the medium-term trajectory Mt) is referred to. Moreover, the trajectory evaluating unit 94 can refer to a detection flag provided by the state detecting unit 84 (see FIG. 2), and change the above-described evaluation standard on the condition that the vehicle 100 is in the low speed traveling state.

As an evaluation method, for example, a deviation is obtained between one or more variables constituting the trajectory plots (x, y, θz, Vs, Va, ρ, γ, δst), and target values (reference values) therefor. The deviation is scored, and a total score is calculated in accordance with a weighting computation. For example, attention should be paid to the fact that, by setting the weighting factor corresponding to a specified parameter to be relatively large, an evaluation result can be obtained that emphasizes the specified parameter.

Figure 6:
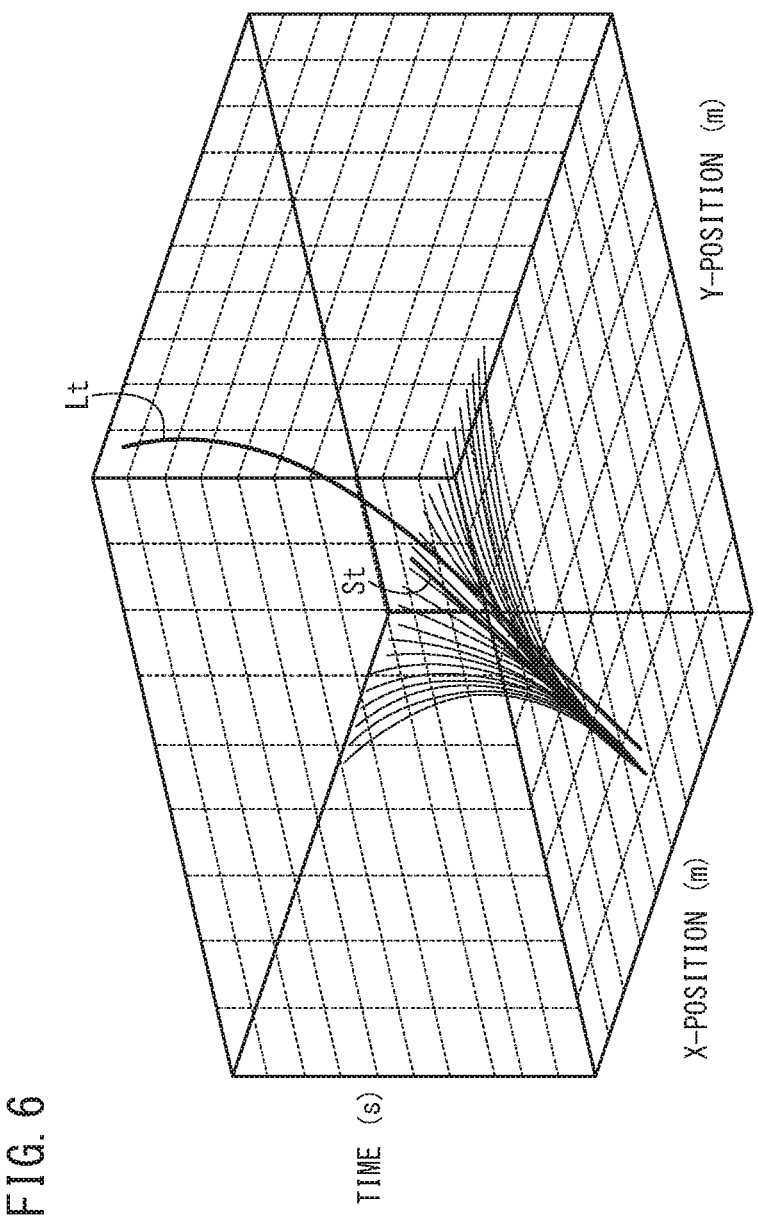
FIG. 6 is a diagram schematically showing results in which one short-term trajectory was decided upon.

FIG. 6 is a diagram schematically showing results in which one of the short-term trajectories St was decided upon. In this figure, a long-term trajectory Lt is superimposed on the large number of trajectory candidates shown in FIG. 5. The short-term trajectory St not only has a close resemblance to the long-term trajectory Lt, but also is evaluated and decided upon comprehensively according to an evaluation standard in relation to realizing of vehicle dynamics and ensuring safety. Therefore, in the example shown in the figure, the short-term trajectory St does not completely coincide with a portion of the long-term trajectory Lt, and has a shape that is slightly shifted from the long-term trajectory Lt.

Using the one trajectory candidate that was decided upon by the evaluation process of the trajectory evaluating unit 94, the output trajectory generating unit 96 generates the short-term trajectory St. Moreover, in the event there is a previously output trajectory (a most recently generated short-term trajectory St), a constraint condition may be provided for achieving consistency with such a trajectory.

<Specific Operations>

Continuing, specific operations of the vehicle control device 10A according to the first embodiment will be described in detail with reference to FIGS. 7 to 11.

Figure 7:
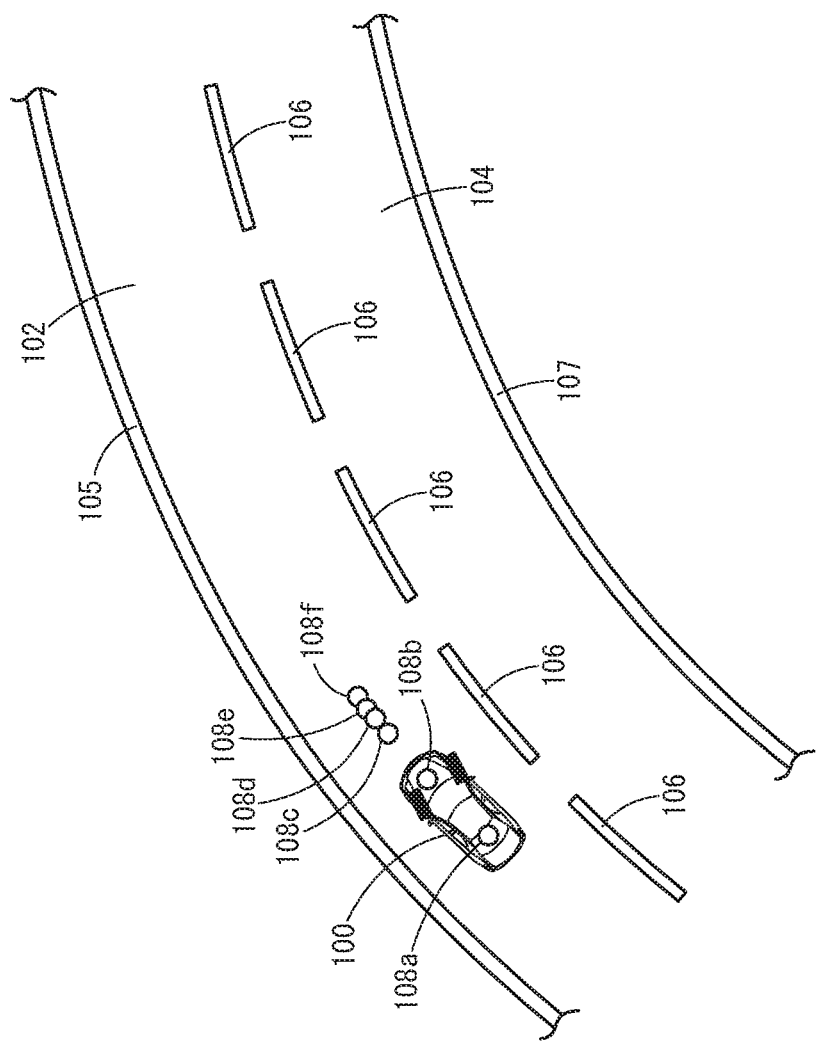
FIG. 7 is a diagram showing a state in which the vehicle travels in a lane.

As shown in FIG. 7, a case is assumed in which the vehicle 100 travels at a slow speed in a travel lane 102 curving in a rightward direction. Concerning the vehicle 100, a condition is shown in which the host vehicle travels on a road in a country where it has been decided that automobiles are to travel on the left side of the road. The travel lane 102 and an opposite lane 104 are partitioned by three lane markings 105, 106, and 107. The lane markings 105 and 107 are continuous lines, whereas the lane marking 106 is a broken line.

In the example shown in the figure, because the vehicle 100 is in a low speed traveling state, plots of the short-term trajectory St (hereinafter referred to as short-term trajectory plots 108a to 108f) are arranged at extremely small intervals. From among the six short-term trajectory plots 108a to 108f, the plot on a side earlier in time corresponds to the plot 108a, and the plot on a side later in time corresponds to the plot 108f.

Incidentally, in the case that the vehicle 100 is in a low speed traveling state, situations may occur in which the reliability of the detection result of the state of the host vehicle or the state of the external environment decreases. For example, even if the steering angle δst is suddenly changed, situations may occur in which the yaw rate γ does not increase significantly in comparison with a time of normal traveling (in which the vehicle speed Vs is greater than or equal to the predetermined value). As a result, there is a concern that the reliability of the steering control may decrease. Thus, according to the first embodiment, in the case that the low speed traveling state of the vehicle 100 is detected, the vehicle control device 10A performs a different operation as compared to during normal traveling.

Figure 8:
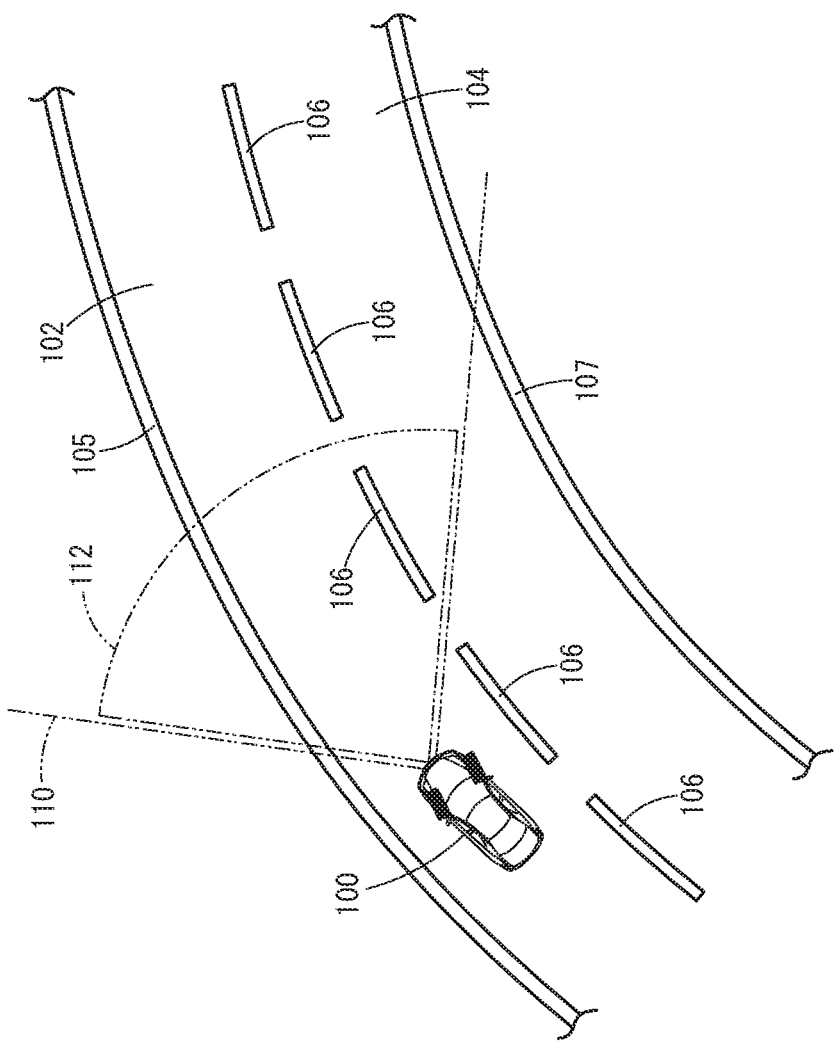
FIG. 8 is a diagram showing the state of a lane detected by the vehicle.

A detection capable area 110, as shown in FIG. 8, indicates an area in which the state of the external environment can be detected using the external environment sensors 14. An approximately fan-shaped reference range 112 is a subset of the detection capable area 110, and corresponds to a range in which a distance from the vehicle 100 is less than or equal to a given threshold value. The reference range 112 is a range in which lane information of high reliability can be detected, and such a range may be changed depending on the type, performance, number, and installation positions of the sensors.

In the example shown in the drawing, the lane information acquisition unit 82 (see FIG. 2) acquires lane information that is actually detected under the low speed traveling state, and more specifically, acquires white line information Lw(x, y, θz, ρ) in relation to the lane markings 105 to 107 that lie within the detection capable area 110. Further, the state detecting unit 84 (see FIG. 2) detects the low speed traveling state of the vehicle 100, and supplies the detection result thereof as a flag (hereinafter referred to as a detection flag) to the target steering angle generating unit 86. Thereafter, in the case that the detection flag (ON state) is received, the target steering angle generating unit 86 generates a target steering angle according to a different evaluation standard as compared to during normal traveling.

Figure 9:
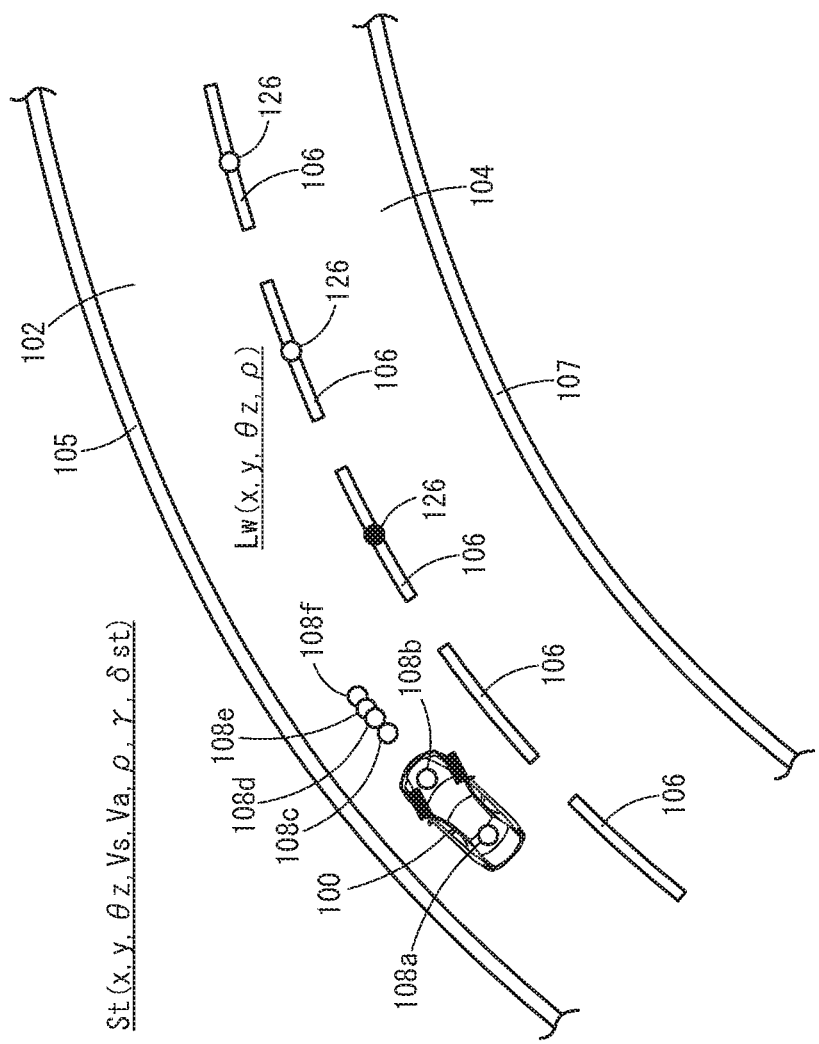
FIG. 9 is a first explanatory diagram concerning a method of evaluating a trajectory candidate.

As shown in FIG. 9, the positions of the detected lane markings 106 (three line elements) are represented by plots of three points (hereinafter referred to as lane plots 126). Among the three lane plots 126, one of the plots (shown by the filled-in circle) lying within the reference range 112 is selected, and the white line information Lw(x, y, θz, ρ) thereof is used as a target value.

In this instance, by adopting an evaluation standard that emphasizes a close resemblance between the attitude parameter indicated by the white line information Lw and the attitude parameter of the vehicle 100, the trajectory evaluating unit 94 can enhance the accuracy in generating the steering angle δst. More specifically, the trajectory evaluating unit 94 may increase the weighting coefficient of the score corresponding to the attitude angle θz and/or the curvature ρ relatively in comparison with a normal situation (when not in the low speed traveling state). Below, an example of calculating the curvature ρ corresponding to the attitude of the vehicle 100 will be described in detail with reference to FIG. 10.

Figure 10:
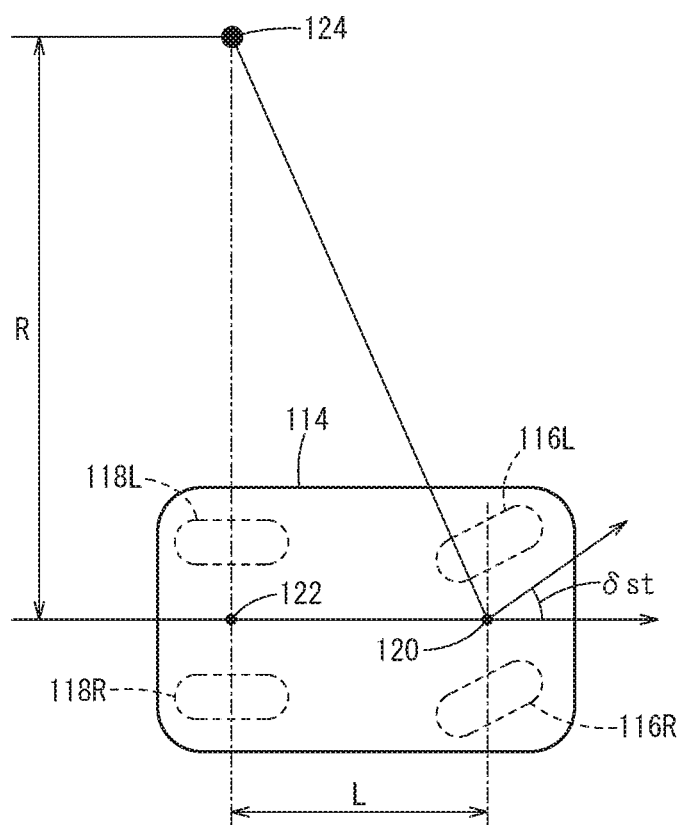
FIG. 10 is an explanatory diagram in relation to a curvature calculation model.

As shown in FIG. 10, the vehicle 100 is regarded as being an object having a rectangular shaped vehicle body 114, a right side front wheel 116R, a left side front wheel 116L, a right side rear wheel 118R, and a left side rear wheel 118L. In such a calculation model, instead of the two front wheels 116R, 116L, there is assumed to be one front wheel at a midpoint 120 between the front wheels 116R, 116L. Similarly, instead of the two rear wheels 118R, 118L, there is assumed to be one rear wheel at a midpoint 122 between the rear wheels 118R, 118L.

In this instance, the steering angle at the midpoint 120 is represented by δst, the distance between the midpoint 120 and the midpoint 122 is represented by L, and the distance between the midpoint 122 and the center of curvature 124 is represented by R. In this case, using the steering angle δst, the curvature ρ corresponding to the attitude of the vehicle 100 is obtained by the following equation (1). The term Ng is a constant (gear ratio) for the purpose of converting the steering angle δst into a steering angle for the vehicle wheels.

$$\rho = 1/R = \tan(\delta st/Ng)/L \tag{1}$$

In this manner, by generating the short-term trajectory St with emphasis placed on the "attitude" of the vehicle 100, even if the vehicle 100 is in the low speed traveling state, it is possible to make the turning angle of the vehicle 100 substantially coincident with the orientation of the travel lane 102. Moreover, in the above example, although the white line information Lw is used as the lane information, other types of lane information may also be used.

Figure 11:
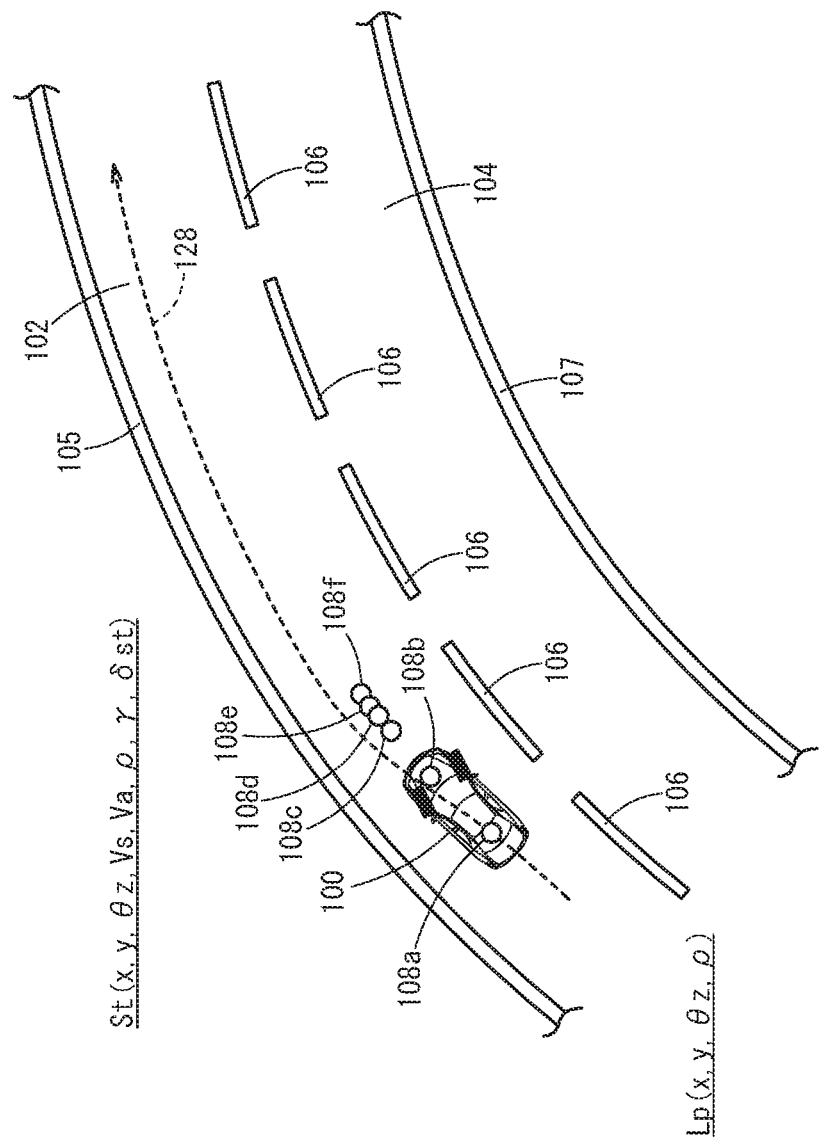
FIG. 11 is a second explanatory diagram concerning a method of evaluating a trajectory candidate.

As shown in FIG. 11, the lane information acquisition unit 82 (see FIG. 2) may acquire other lane information that is included in the local environment map information Iem, and more specifically, may acquire route information Lp(x, y, θz, ρ) in relation to the positioning of an ideal travel route 128 (shown by a broken line) for the vehicle 100. In this instance, the ideal travel route 128 is an ideal route to enable the vehicle 100 to travel smoothly on the travel lane 102, and may be the same route as the center line of the travel lane 102, or may be a route that differs from the center line.

<Advantages and Effects of the First Embodiment>

As discussed above, the vehicle control device 10A is a device which is configured to be capable of implementing automatic driving or providing an automatic driving assist, including [1] the external environment state detecting unit 80 that detects a state of the external environment of the vehicle 100, [2] the lane information acquisition unit 82 which acquires lane information that is capable of specifying the shape of a travel lane 102 in which the vehicle 100 intends to travel, on the basis of a detection result by the external environment state detecting unit 80, [3] the state detecting unit 84 that detects a low speed traveling state in which the speed Vs of the vehicle 100 is less than or equal to a predetermined value, [4] the target steering angle generating unit 86 which generates a target steering angle for the vehicle 100 from a relationship between the acquired lane information and an attitude of the vehicle 100, during a period in which the low speed traveling state is being detected, and [5] the steering angle control unit 88 that controls the steering angle of the vehicle 100 so as to agree with the generated target steering angle.

Stated otherwise, using one or a plurality of processors, and based on the detection results of the state of the external environment of the vehicle 100, the vehicle control device 10A implements the "vehicle control method" to acquire lane information that is capable of specifying the shape of the travel lane 102 in which the vehicle 100 intends to travel, to detect a low speed traveling state in which the speed Vs of the vehicle 100 is less than or equal to a predetermined value, to generate a target steering angle for the vehicle 100 from the relationship between the acquired lane information and the attitude of the vehicle 100 during a period in which the low speed traveling state is being detected, and to perform the steering angle control for the vehicle 100 in agreement with the generated target steering angle.

In a low speed traveling state in which the speed Vs of the vehicle 100 is less than or equal to a predetermined value, cases may occur in which the reliability of the detection result of the state of the host vehicle or the state of the external environment decreases. Thus, during a period in which the low speed traveling state is being detected, lane information and attitude information of the vehicle 100 having a relatively high reliability of detection accuracy are used, and therefore, the target steering angle for steering the vehicle in a direction along the shape of the travel lane 102 can be generated with high accuracy. Consequently, even if the speed of the vehicle 100 is less than or equal to the predetermined value, the vehicle 100 can be made to proceed smoothly in a desired direction.

Further, [6] the lane information acquisition unit 82 may acquire the lane information (specifically, the white line information Lw) actually detected by the external environment state detecting unit 80 under the low speed traveling state, and [7] the target steering angle generating unit 86 may generate the target steering angle from a relationship between the orientation ($\theta z$) of the vehicle 100 and the orientation ($\theta z$) of the travel lane 102 as indicated by the lane information, and/or from a relationship between the curvature ($\rho$) corresponding to the attitude of the vehicle 100 and the curvature ($\rho$) of the travel lane 102 as indicated by the lane information.

[Modification of the First Embodiment]

Continuing, a modification of the first embodiment will be described with reference to FIGS. 12 and 13. In this modification, the functions of the lane information acquisition unit 130 and the target steering angle generating unit 132 differ from those of the first embodiment (the lane information acquisition unit 82 and the target steering angle generating unit 86 in FIG. 2).

<Detailed Block Diagram of Target Steering Angle Generating Unit 132>

Figure 12:
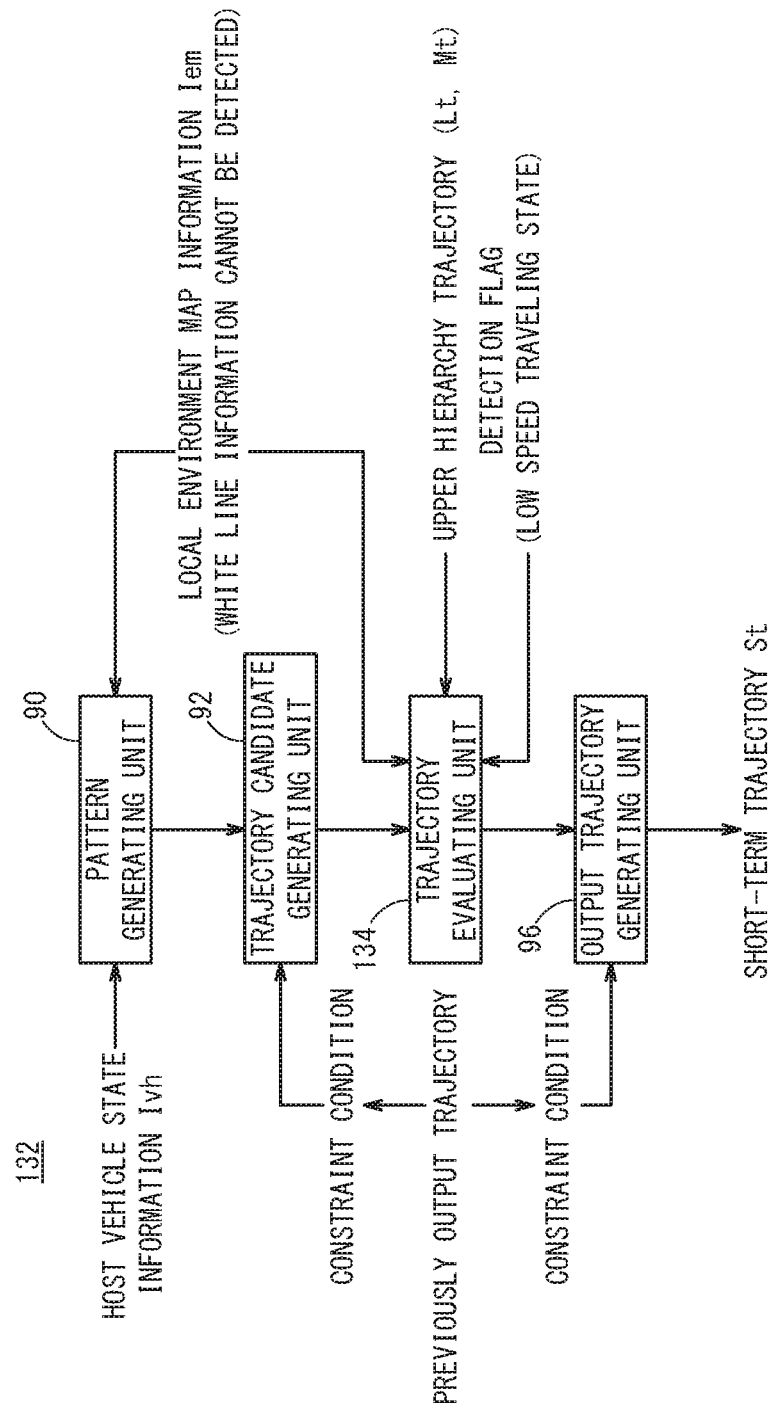
FIG. 12 is a detailed block diagram of a target steering angle generating unit according to a modification.

FIG. 12 is a detailed block diagram of the target steering angle generating unit 132 in the modification. In addition to the pattern generating unit 90, the trajectory candidate generating unit 92, and the output trajectory generating unit 96, the target steering angle generating unit 132 comprises a trajectory evaluating unit 134 that differs from the trajectory evaluating unit 94 (see FIG. 3).

The trajectory evaluating unit 134 performs an evaluation process in accordance with a predetermined evaluation standard with respect to each of the large number of trajectory candidates that were generated by the trajectory candidate generating unit 92. As the evaluation standard, the local environment map information Iem (this is premised on it being "impossible to detect the white line information Lw"), or an upper hierarchy trajectory (the long-term trajectory Lt or the medium-term trajectory Mt) is referred to. Moreover, the trajectory evaluating unit 134 can refer to a detection flag provided by the state detecting unit 84 (see FIG. 3), and change the above-described evaluation standard on the condition that the vehicle 100 is in the low speed traveling state.

Figure 13:
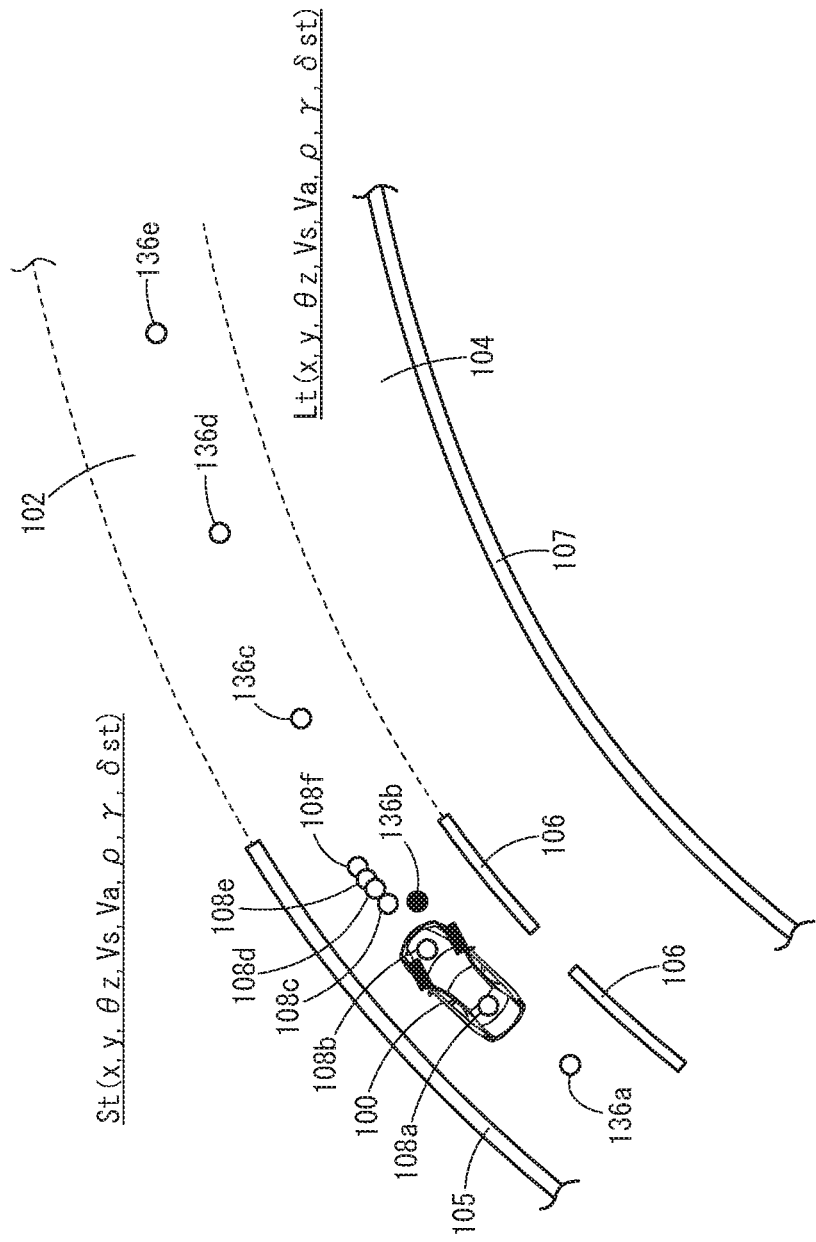
FIG. 13 is a third explanatory diagram concerning a method of evaluating a trajectory candidate.

As shown in FIG. 13, the vehicle 100 travels in the automatic driving mode at a slow speed in a travel lane 102 curving in a rightward direction. In the same manner as in FIG. 7, the travel lane 102 and an opposite lane 104 are partitioned by three lane markings 105, 106, and 107. The lane markings 105 and 106 at positions near the vehicle 100 are marked to the extent that they are capable of being recognized. However, a condition is assumed in which lane markings that should appear in front of the vehicle have disappeared due to deterioration or the like, and such lane markings cannot be recognized.

In the example shown in the drawing, the lane information acquisition unit 130 (FIG. 2) acquires the lane information that was stored most recently in the storage device 40 under a low speed traveling state, and more specifically, acquires the long-term trajectory Lt(x, y, $\theta z$, Vs, Va, $\rho$, $\gamma$, $\delta st$) which belongs to the upper hierarchy trajectory. Further, the state detecting unit 84 (see FIG. 2) detects the low speed traveling state of the vehicle 100, and supplies the detection result thereof as a detection flag to the target steering angle generating unit 132. Thereafter, in the case that the detection flag (ON state) is received, the target steering angle generating unit 132 generates a target steering angle according to a different evaluation standard as compared to during normal traveling.

As shown in FIG. 13, plots of the long-term trajectory Lt (hereinafter referred to as long-term trajectory plots 136a to 136e) are arranged at relatively large intervals in comparison with those of the short-term trajectory plots 108a to 108f. From among the five long-term trajectory plots 136a to 136e, the plot on a side earlier in time corresponds to the plot 136a, and the plot on a side later in time corresponds to the plot 136e.

Among the five long-term trajectory plots 136a to 136e, one long-term trajectory plot 136b that is closest to the vehicle 100 is selected, and the long-term trajectory Lt(x, y, $\theta z$, Vs, Va, $\rho$, $\gamma$, $\delta st$) thereof is used as a target value.

In this instance, by adopting an evaluation standard that emphasizes a close resemblance between the attitude parameter indicated by the long-term trajectory Lt and the attitude parameter of the vehicle 100, the trajectory evaluating unit 134 can enhance the accuracy in generating the steering angle $\delta st$. More specifically, the trajectory evaluating unit 134 may increase the weighting coefficient of the score corresponding to the attitude angle $\theta z$ and/or the curvature $\rho$ relatively in comparison with a normal situation (when the detection flag is in an OFF state).

In this manner, [1] the vehicle control device 10A may further comprise the long-term trajectory generating unit 71 (trajectory generating unit) that generates a long term trajectory Lt (travel trajectory) for the vehicle 100 based on the detection result by the external environment state detecting unit 80, wherein [2] the lane information acquisition unit 130 acquires lane information (more specifically, the long term trajectory Lt) that was stored most recently in the storage device 40 under the low speed traveling state, and [3] the target steering angle generating unit 132 may generate the target steering angle from a relationship between the orientation (θz) of the vehicle 100 and the orientation (θz) of the travel lane 102 as indicated by the lane information, and/or from a relationship between the curvature (ρ) corresponding to the attitude of the vehicle 100 and the curvature (ρ) of the travel lane 102 as indicated by the lane information.

Second Embodiment

Continuing, a description will be given with reference to FIGS. 14 to 16B concerning a vehicle control device 10B (in particular, the short-term trajectory generating unit 74) according to the second embodiment. The same constituent elements as those in the first embodiment are denoted with the same reference numerals, and detailed description in relation to such constituent elements is omitted.

<Principal Characteristic Components>

Figure 14:
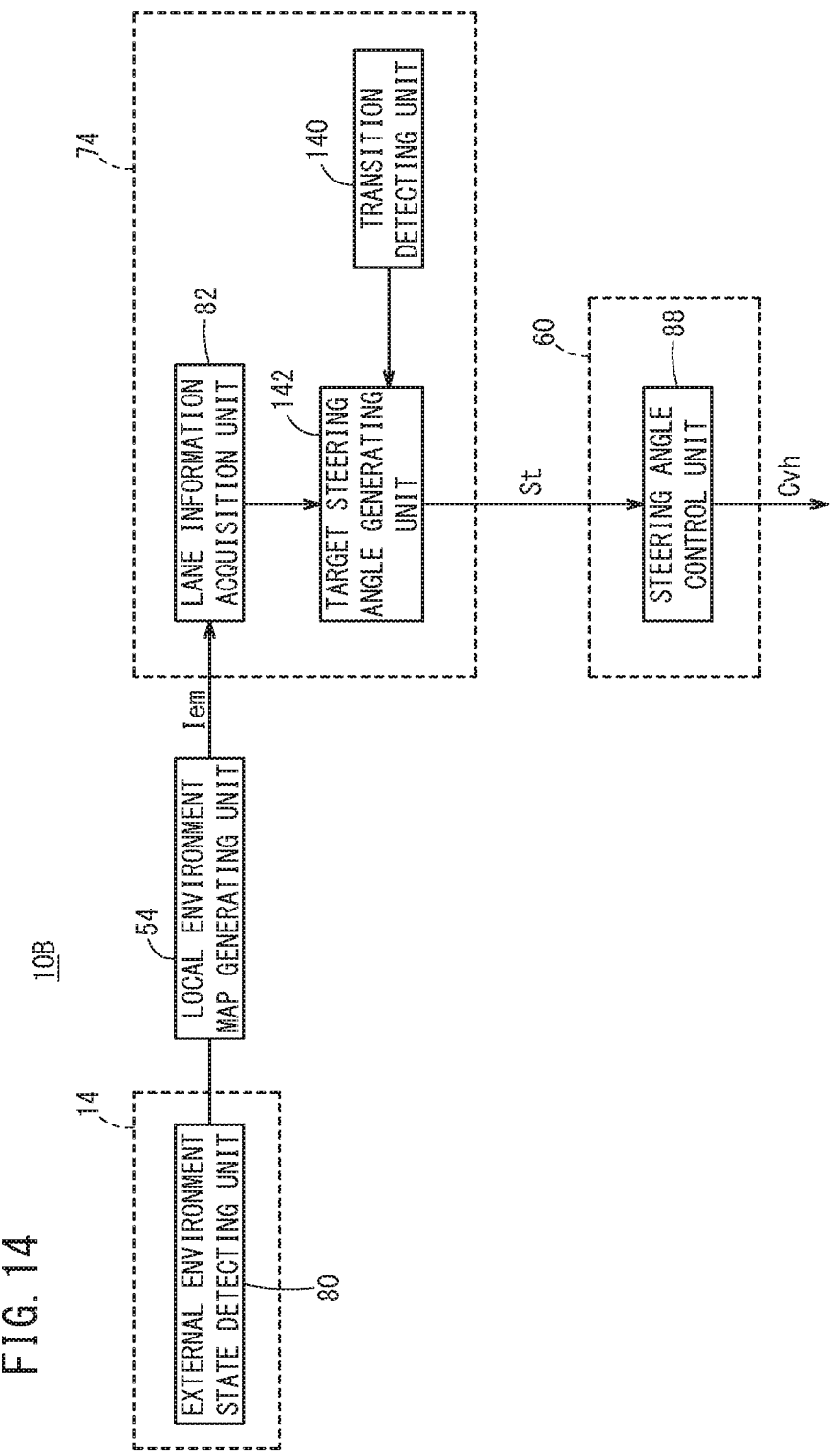
FIG. 14 is a functional block diagram showing principal characteristic components in a second embodiment.

FIG. 14 is a functional block diagram showing principal characteristic components in the second embodiment. In addition to the local environment map generating unit 54 (see FIG. 1), and in addition to the external environment state detecting unit 80, the lane information acquisition unit 82, and the steering angle control unit 88, the vehicle control device 10B includes a transition detecting unit 140 and a target steering angle generating unit 142.

The external environment state detecting unit 80 corresponds to the external environment sensors 14 shown in FIG. 1. The lane information acquisition unit 82, the transition detecting unit 140, and the target steering angle generating unit 142 correspond to the short-term trajectory generating unit 74 shown in FIG. 1. The steering angle control unit 88 corresponds to the vehicle control unit 60 shown in FIG. 1.

The transition detecting unit 140 perceives a change in the state of the automatic driving switch 22 (see FIG. 1), and detects a point in time (hereinafter referred to as the mode transition time point) when the automatic driving mode transitions from an OFF state into an ON state while the vehicle 100 is stopped.

The target steering angle generating unit 142 generates a target steering angle (a time-series pattern for the steering angle δst) to be used for generating the short-term trajectory St using at least the lane information that is acquired by the lane information acquisition unit 82. The target steering angle generating unit 142 generates a target steering angle from the relationship between the acquired lane information and the attitude of the vehicle 100, during a period from the mode transition time point detected by the transition detecting unit 140 until a predetermined condition is satisfied.

The term "predetermined condition" as used herein implies, for example, that [1] a value of a difference between the orientation of the travel lane 102 as indicated by the lane information and the orientation of the vehicle 100 (an absolute value of a deviation between the posture angles θz thereof) is less than or equal to a first threshold value, [2] a difference value between a curvature ρ of the travel lane 102 as indicated by the lane information and a curvature ρ corresponding to the attitude or posture of the vehicle 100 (an absolute value of the deviation between the respective curvatures ρ) is less than or equal to a second threshold value, or alternatively, [3] the aforementioned two conditions are satisfied simultaneously.

<Detailed Block Diagram of Target Steering Angle Generating Unit 142>

FIG. 15 is a detailed block diagram of the target steering angle generating unit 142 shown in FIG. 14. In addition to the pattern generating unit 90, the trajectory candidate generating unit 92, and the output trajectory generating unit 96, the target steering angle generating unit 142 further comprises a trajectory evaluating unit 144 that operates differently from that of the first embodiment (the trajectory evaluating unit 94 of FIG. 3).

The trajectory evaluating unit 144 performs an evaluation process in accordance with a predetermined evaluation standard with respect to each of the large number of trajectory candidates that were generated by the trajectory candidate generating unit 92. As the evaluation standard, the local environment map information Iem (this is premised on it being "possible to detect the white line information Lw"), or an upper hierarchy trajectory (the long-term trajectory Lt or the medium-term trajectory Mt) is referred to. Moreover, the trajectory evaluating unit 144 can change the above-described evaluation standard by referring to the detection flag provided by the transition detecting unit 140 (FIG. 14), and on the condition that the vehicle speed Vs is substantially zero [km/h] and a transition into the automatic driving mode has been carried out. As the evaluation method, the same method as in the case of the first embodiment may be adopted.

<Specific Operations>

Continuing, specific operations of the vehicle control device 10B according to the second embodiment will be described in detail with reference to FIGS. 16A and 16B.

FIG. 16A and FIG. 16B are transition diagrams showing changes over time in the behavior of the vehicle 100. A case is assumed in which the vehicle 100 is stopped at the straight travel lane 102. The travel lane 102 and an opposite lane 104 are partitioned by three lane markings 105, 106, and 107. The lane markings 105 and 107 are continuous lines, whereas the lane marking 106 is a broken line.

However, in the case that the automatic driving mode has transitioned from the OFF state to the ON state while the vehicle 100 is stopped, because the amount of information relating to the vehicle state or the external environment state is insufficient for a certain period from the point in time at which a mode transition is made, cases may occur in which automatic driving of the vehicle 100 cannot be performed smoothly.

For example, as shown in FIG. 16A, the short-term trajectory plots 108a to 108e are all in the same position when the vehicle 100 is stopped. In the case that the automatic driving mode transitions into the ON state under a condition in which the steering wheel is steered significantly in a rightward turning direction with respect to the orientation of the travel lane 102, the vehicle 100 begins traveling while the steering wheel is returned in a leftward turning direction. Upon doing so, there is a possibility for the vehicle 100 to travel forward across the lane marking 106.

Thus, according to the second embodiment, in the case that the automatic driving mode is detected to be in the ON state while the vehicle 100 is stopped, the vehicle control device 10B performs a different operation as compared to during normal traveling.

Similar to FIG. 8, the detection capable area 110 shown in FIG. 16A indicates an area in which the state of the external environment can be detected using the external environment sensors 14. An approximately fan-shaped reference range 112 is a subset of the detection capable area 110, and corresponds to a range in which a distance from the vehicle 100 is less than or equal to a given threshold value.

In the example shown in the drawing, the lane information acquisition unit 82 (see FIG. 14) acquires lane information that is actually detected from the point in time when the mode transition is made, and more specifically, acquires white line information Lw(x, y, θz, ρ) in relation to the lane markings 105 to 107 that lie within the detection capable area 110. Further, the transition detecting unit 140 detects the mode transition time point, and supplies the detection result thereof as a flag (hereinafter referred to as a detection flag) to the target steering angle generating unit 142. Thereafter, in the case that the detection flag (ON state) is received, the target steering angle generating unit 142 generates a target steering angle according to a different evaluation standard as compared to during normal traveling.

As shown in FIG. 16B, the positions of the detected lane markings 106 (two line elements) are represented by lane plots 126 at two points. Among the two lane plots 126 that were detected, one of the plots (shown by the filled-in circle) lying within the reference range 112 is selected, and the white line information Lw(x, y, θz, ρ) thereof is used as a target value.

In this instance, by adopting an evaluation standard that emphasizes a close resemblance between the attitude parameter indicated by the white line information Lw and the attitude parameter of the vehicle 100, the trajectory evaluating unit 144 can enhance the accuracy in generating the steering angle δst. More specifically, the trajectory evaluating unit 144 may increase the weighting coefficient of the score corresponding to the attitude angle θz and/or the curvature ρ relatively in comparison with a normal situation (when the detection flag is in an OFF state).

In this manner, by sequentially generating the short-term trajectories St with emphasis placed on the "attitude" of the vehicle 100, and during a period from the mode transition time point until the predetermined condition is satisfied, while the vehicle 100 remains in a substantially stopped state, it is possible to make the turning angle substantially coincident with the orientation of the travel lane 102.

It is particularly effective to carry out the above-described operation in the event that the automatic driving mode transitions into the ON state under a condition in which there is a significant divergence with respect to an ideal posture for the vehicle 100. As another specific example, there may be cited a case in which the navigation device 16 is operated while the vehicle 100 is stopped at an intersection, and the travel route and travel direction for the vehicle 100 undergo a sudden change (from traveling straight ahead to turning to the right or left, or vice versa).

Further, in the second embodiment, similar to the case of FIG. 11 (first embodiment), as the lane information, route information Lp(x, y, θz, ρ) in relation to the positioning of an ideal travel route 128 contained within the local environment map information Iem may be used.

<Advantages and Effects of the Second Embodiment>

As discussed above, the vehicle control device 10B is a device which is configured to be capable of implementing automatic driving or providing an automatic driving assist, including [1] the external environment state detecting unit 80 that detects a state of the external environment of the vehicle 100, [2] the lane information acquisition unit 82 which acquires lane information that is capable of specifying the shape of a travel lane 102, on the basis of a detection result by the external environment state detecting unit 80, [3] the transition detecting unit 140 that detects a mode transition time point at which an automatic driving mode transitions from an OFF state to an ON state while the vehicle 100 is stopped, [4] the target steering angle generating unit 142 which generates a target steering angle for the vehicle 100 from a relationship between the acquired lane information and an attitude of the vehicle 100, during a period from the detected mode transition time point until a predetermined condition is satisfied, and [5] the steering angle control unit 88 that controls the steering angle of the vehicle 100 so as to agree with the generated target steering angle.

Stated otherwise, using one or a plurality of processors, and based on the detection results of the state of the external environment of the vehicle 100, the vehicle control device 10B implements the "vehicle control method" to acquire lane information that is capable of specifying the shape of the travel lane 102, to detect the mode transition time point at which the automatic driving mode transitions from an OFF state to an ON state while the vehicle 100 is stopped, to generate a target steering angle for the vehicle 100 from the relationship between the acquired lane information and the attitude of the vehicle 100 during a period from the detected mode transition time point until a predetermined condition is satisfied, and to perform the steering angle control for the vehicle 100 in agreement with the generated target steering angle.

Because the amount of information relating to the vehicle state or the external environment state is insufficient for a certain period from the point in time at which a mode transition is made to transition the automatic driving mode from the OFF state to the ON state while the vehicle 100 is stopped, cases may occur in which automatic driving of the vehicle 100 cannot be performed smoothly. Thus, until the predetermined condition is satisfied, lane information and attitude information of the vehicle 100 having a relatively high reliability of detection accuracy are used, and therefore, the target steering angle for steering the vehicle 100 in a direction along the shape of the travel lane 102 can be generated with high accuracy. Consequently, even immediately after transitioning into the automatic driving mode, the vehicle 100 can be made to proceed smoothly in a desired direction.

Further, [6] the lane information acquisition unit 82 may acquire the lane information (specifically, the white line information Lw) actually detected by the external environment state detecting unit 80 until the predetermined condition is satisfied, and [7] the target steering angle generating unit 142 may generate the target steering angle from a relationship between the orientation (θz) of the vehicle 100 and the orientation (θz) of the travel lane 102 as indicated by the lane information, and/or from a relationship between the curvature (ρ) corresponding to the attitude of the vehicle 100 and the curvature (ρ) of the travel lane 102 as indicated by the lane information.

[Supplemental Considerations]

The present invention is not limited to the embodiments described above, and it goes without saying that the present invention can be freely modified within a range that does not depart from the essence and gist of the present invention. Alternatively, the respective configurations may be combined arbitrarily within a range in which no technical inconsistencies occur.

In the embodiments, although a description was given of a case in which the steering angle of the steering wheel is changed, the control target (steering angle) may be a different physical quantity or a controlled quantity related to steering of the vehicle 100. For example, the steering angle may be a turning angle or a toe angle of the vehicle wheels, or may be a steering angle command value defined inside the vehicle control unit 60.

In the embodiments, although configurations are adopted in which automatic steering of the steering wheel is performed, the means by which the steering angle is changed is not limited to this feature. For example, the vehicle control unit 60 may output a steer-by-wire command signal to the side of the steering mechanism, and thereby change the steering angle as a turning angle of the wheels. Alternatively, the steering angle as a turning angle of the wheels may be changed by providing a speed difference between the speed of rotation of the inner wheels and the speed of rotation of the outer wheels.

What is claimed is:

1. A vehicle control device which is configured to be capable of implementing automatic driving or providing an automatic driving assist, comprising:
   an external environment state detecting unit adapted to detect a state of external environment of a vehicle;
   a lane information acquisition unit adapted to acquire lane information that is capable of specifying shape of a lane in which the vehicle intends to travel, on basis of a detection result by the external environment state detecting unit;
   a state detecting unit adapted to detect a low speed traveling state in which speed of the vehicle is less than or equal to a predetermined value;
   a target steering angle generating unit adapted to generate a target steering angle for the vehicle from a relationship between lane information acquired from the lane information acquisition unit and an attitude of the vehicle, during a period in which the low speed traveling state is being detected; and
   a steering angle control unit adapted to control a steering angle of the vehicle so as to agree with the target steering angle generated by the target steering angle generating unit.

2. The vehicle control device according to claim 1, wherein the target steering angle generating unit generates the target steering angle from a relationship between an orientation of the vehicle and an orientation of the lane as indicated by the lane information, and/or from a relationship between a curvature corresponding to the attitude of the vehicle and a curvature of the lane as indicated by the lane information.

3. The vehicle control device according to claim 1, wherein the lane information acquisition unit acquires the lane information which is actually detected by the external environment state detecting unit under the low speed traveling state.

4. The vehicle control device according to claim 1, further comprising:
   a trajectory generating unit adapted to generate a travel trajectory for the vehicle based on a detection result by the external environment state detecting unit;
   wherein the lane information acquisition unit acquires as the lane information the travel trajectory generated by the trajectory generating unit.

5. A vehicle control device which is configured to be capable of implementing automatic driving or providing an automatic driving assist, comprising:
   an external environment state detecting unit adapted to detect a state of external environment of a vehicle;
   a lane information acquisition unit adapted to acquire lane information that is capable of specifying shape of a lane in which the vehicle intends to travel, on basis of a detection result by the external environment state detecting unit;
   a transition detecting unit adapted to detect a mode transition time point at which an automatic driving mode transitions from an OFF state to an ON state while the vehicle is stopped;
   a target steering angle generating unit adapted to generate a target steering angle for the vehicle from a relationship between lane information acquired from the lane information acquisition unit and an attitude of the vehicle, during a period from the mode transition time point detected by the transition detecting unit until a predetermined condition is satisfied; and
   a steering angle control unit adapted to control a steering angle of the vehicle so as to agree with the target steering angle generated by the target steering angle generating unit.

6. The vehicle control device according to claim 5, wherein the target steering angle generating unit generates the target steering angle from a relationship between an orientation of the vehicle and an orientation of the lane as indicated by the lane information, and/or from a relationship between a curvature corresponding to the attitude of the vehicle and a curvature of the lane as indicated by the lane information.

7. The vehicle control device according to claim 5, wherein the lane information acquisition unit acquires, until the predetermined condition is satisfied, the lane information which is actually detected by the external environment state detecting unit.

* * * * *